United States Patent Office 3,193,529
Patented July 6, 1965

3,193,529
PROCESS FOR PREPARATION OF POLYCARBONATES EMPLOYING PHOSPHONIUM CATALYSTS
Bryce C. Oxenrider, Florham Park, N.J., assignor to Allied Chemical Corporation, New York, N.Y., a corporation of New York
No Drawing. Filed Sept. 22, 1960, Ser. No. 57,610
9 Claims. (Cl. 260—47)

The present invention relates to a process for the preparation of high molecular weight polycarbonate resins. More specifically the present invention resides in a process for the preparation of high molecular weight polycarbonate resins using a quaternary phosphonium compound as a catalyst.

Polycarbonate resins may be prepared by reacting phosgene and a di-monohydroxyaryl-alkane in an aqueous alkaline medium in the presence of a catalyst and solvent for the polycarbonate resin formed. Conventionally phosgene is introduced into a solution of the aromatic dihydroxy compound in an aqueous alkaline medium at ambient temperatures, with the reaction being conducted in the presence of a solvent and a catalyst. The catalyst for the reaction is employed in order to economically obtain satisfactory molecular weights. Pursuant to this objective the catalyst which is employed should exhibit various characteristics. It should have good activity so that high molecular weights may be obtained within a short period of time. It should be substantially stable to the reactants and reaction products under the conditions of the reaction. In addition it is desirable if the catalyst employed be utilizable in reasonably small quantities. The prior art conventionally employed quaternary ammonium compounds as catalysts for the reaction. These compounds are subject to the objection that they only slowly catalyze the reaction, that is, when they are used in small amounts extended reaction times are required.

Accordingly, it is an object of the present invention to provide a process for the preparation of high molecular weight polycarbonate resins.

It is a further object of the present invention to provide catalysts for the preparation of high molecular weight polycarbonate resins, which catalysts have excellent activity so that high molecular weight products may be obtained within a short period of time.

It is a further object of the present invention to provide a process for the preparation of high molecular weight polycarbonate resins utilizing catalysts for the reaction which enable the attainment of numerous distinct advantages, for example, catalysts which are substantially stable under conditions of the reaction, and catalysts which are utilizable in small amounts and still enable the attainment of high molecular weight products within a short period of time.

Further objects and advantages of the present invention will appear hereinafter.

In accordance with the present invention it has been found that high molecular weight polycarbonate resins may be obtained, accomplishing the aforementioned objects and advantages of the present invention, by reacting together phosgene and a di-monohydroxyaryl-alkane in an aqueous alkaline medium in the presence of an inert organic solvent which is immiscible in the aqueous phase, and in the presence of a catalytic amount of a quaternary phosphonium compound as a catalystt for the reaction. It has been further found that the quaternary phosphonium compounds, which are the catalysts of the present invention, exhibit surprising catalytic activity, which activity is greater than the prior art quaternary ammonium compounds, and obtain the very desirable higher molecular weights within a shorter period of time.

The quaternary phosphonium compounds which may be employed in the present invention are those which are soluble in the reaction medium and are substantially stable under the conditions of the reaction. The quaternary phosphonium compounds are preferably employed in amounts from about 0.001 to about 5.0 percent by weight based on the dihydroxy compound. The quaternary phosphonium compounds satisfying the aforementioned definition are generally the quaternary phosphonium hydroxides, halides, carbonates or bi-carbonates which are soluble in the aqueous and organic phases of the reaction medium. Mixtures of any of the aforementioned compounds may also be advantageously employed. The phosphonium radical itself may be substituted with a variety of substituents, namely alkyl, aryl, aralkyl, alkaryl, alkenyl, alkynyl, or mixtures thereof. In addition any of the aforementioned substituents may be substituted with non-interfering groups, for example, halo or nitro, and, more generally, any group without a reactive hydrogen. Generally speaking any of the individual substituents on the phosphonium radical may have from 2 to 20 carbons, with the total number of carbons being not less than 8 and not more than 40. Typical substituents include the following: alkyl, such as ethyl, propyl, butyl, pentyl, hexyl, nonyl, decyl, and hexadecyl; aryl, such as phenyl, napthyl, and anthracyl; aralkyl, such as benzyl, phenyl-ethyl, phenyl-hexyl, and naphthyl-methyl; alkaryl, such as xylyl, tolyl, and meta-ethylphenyl; alkenyl, such as vinyl and allyl; alkynyl, such as ethynyl and butynyl; and halo or nitro-substituted substituents, such as 2-chloroethyl, 3-bromopropyl, para-chlorobenzyl, and 2,4-dinitrobenzyl.

The quaternary phosphonium compounds which are the catalysts of the present invention are known in the art and may be prepared, for example, by heating together a tri-substituted phosphine and a substituted halide in the presence of a solvent, and precipitating the resultant quaternary phosphonium compound from solution. An illustrative reaction is the reaction between tri-butyl phosphine and butyl bromide to give tetrabutyl phosphonium bromide.

In the di-monohydroxyaryl-alkanes to be used the two aryl radicals may be identical or different. Furthermore, the aryl radicals may contain substituents which cannot react during the conversion into polycarbonates, such as halogen or alkyl groups, e.g., methyl, ethyl, propyl or tert-butyl groups. The alkyl radical of the di-monohydroxyaryl-alkanes linking the two benzene rings may consist either of an open chain or of a cycloaliphatic ring.

The following are examples of such di-monohydroxyaryl-alkanes:

(4,4'-dihydroxy-diphenyl)-methane,
2,2-(4,4'-dihydroxy-diphenyl)-propane, (Bisphenol-A),
1,1-(4,4'-dihydroxy-diphenyl)-cyclohexane,
1,1-(4,4'-dihydroxy-3,3'-dimethyl-diphenyl)-cyclohexane,
2,2-(2,2'-dihydroxy-4,4'-di-tert-butyl-diphenyl)-propane,
3,4-(4,4'-dihydroxy-diphenyl)-hexane,
1,1-(4,4'-dihydroxy-diphenyl)-1-phenyl-ethane,
2,2-(4,4'-dihydroxy-diphenyl)-butane,
2,2-(4,4'-dihydroxy-diphenyl)-pentane,
3,3-(4,4'-dihydroxy-diphenyl)-pentane,
2,2-(4,4'-dihydroxy-diphenyl)-3-methyl-pentane,
2,2-(4,4'-dihydroxy-diphenyl)-hexane,
2,2-(4,4'-dihydroxy-diphenyl)-4-methyl-pentane,
2,2-(4,4'-dihydroxy-diphenyl)-heptane,
4,4-(4,4'-dihydroxy-diphenyl)-heptane, and
2,2-(4,4'-dihydroxy-diphenyl)-tridecane.

These compounds can easily be produced in conventional fashion by condensation of aldehydes or ketones with phenols.

To obtain special properties, mixtures of different di-monohydroxyaryl-alkanes may be used.

The ratio of phosgene to di-monohydroxyaryl-alkane is not critical. Practically, however, at least 0.1 mole of phosgene is employed per mole of aromatic dihydroxy compound. Theoretically an equimolar amount of phosgene to dihydroxy compound is required for complete conversion of dihydroxy compound to polycarbonate; however, to compensate for loss of phosgene by side reactions the normal operation uses slightly more than one mole of phosgene per mole of dihydroxy compound. Accordingly, it has been found that the preferred ratio of phosgene to dihydroxy compound is from about 1.1 to 1.5 moles of phosgene per mole of dihydroxy compound. If less than one mole is employed correspondingly less of the dihydroxy compound will be converted to polycarbonate. If too much phosgene is employed the extra amount will merely be unconsumed.

The dihydroxy aromatic compound is reacted with phosgene in an aqueous alkaline medium. Preferably the phosgene is introduced into an aqueous solution of alkali metal salt, such as lithium, sodium, potassium, etc., of the di-monohydroxyaryl-alkane. It is preferred to employ an excess of base, such as lithium, sodium, or potassium hydroxide.

The phosgene is preferably slowly introduced into the aqueous alkaline solution, with the preferred time of addition being from about 15 minutes to about 4 hours. Naturally, in a continuous operation the phosgene will be continuously introduced. The temperatures of the reaction may vary within a wide range, that is, it may be carried out at room temperature or lower or higher temperatures as desired. Generally temperatures from the freezing point to the boiling point of the mixture may be utilized. The catalyst may be introduced either before or during the reaction. After the phosgene is introduced the reaction mixture is preferably stirred in order to allow growth to high molecular weights, with molecular weight growth occurring in the organic phase.

The polymer should be soluble in the solvent which is employed, and the solvent should be substantially inert under the conditions of the reaction, immiscible in the aqueous phase and have a sufficiently high boiling point to allow for reaction at elevated temperatures, if desired. Generally speaking, it is preferred to employ a solvent which has a boiling point of 30° C. to 80° C. The solvent is preferably added initially, and added in amounts so that the final polymeric solution is fluid. The amount of solvent is not critical, but practically from two to 500 parts by weight of solvent based on the polycarbonate formed should be used. Typical solvents which may be employed include the following oragnic solvents; benzene; methylcyclohexane; cyclohexane; toluene; xylene; chloroform; carbon tetrachloride; trichloroethylene; perchloroethylene; methylene chloride; ethylene chloride; etc.

If no organic solvents are employed in the process only low molecular weight polymer is produced and this low molecular weight polycarbonate precipitates from solution substantially as formed.

The polymer may be recovered from solution by conventional means, such as evaporation or distillation of solvent, or precipitating the polymer by the addition of a non-solvent, such as methanol, isopropanol, etc.

Potential chain terminators may be employed in the process of the present invention in order to control molecular weight, such as phenol, tertiary butyl phenol, chlorophenol, nonyl alcohol, butyl alcohol, etc.

Various additives may be employed, such as antioxidants, additives to prevent decomposition of phosgene, and additives to preferentially react with phosgene decomposition products. Typical of such additives are sodium dithionite, potassium bisulfite, carbon monoxide, etc.

The polycarbonates obtained by the present process have the desirable characteristics of polycarbonates, and may be easily processed into valuable formed articles or coatings by compression molding, extrusion, injection molding or flame spraying. The polycarbonates prepared by the process of the present invention can also be processed into films and fibers, which can be oriented by stretching. By this stretching operation the strength of these products is considerably increased, while elongation is decreased. The polycarbonates produced by the present process can also be processed in combination with plasticizers or with fillers such as asbestos or glass fibers.

In the following examples a 0.1 percent solution of the polymer in ethylene chloride was used to measure dilute solution intrinsic viscosity at 25° C. in an Oswald-Fenske viscometer, and molecular weight calculated from the following equation, wherein $\eta_i$ is viscosity:

$$\eta_i = 1.23 \times 10^{-4} MW^{0.83}$$

The following examples will serve to further illustrate the present invention.

EXAMPLE 1

*Polycarbonate preparation without catalyst*

A 1-liter resin pot, fitted with stirrer, thermometer, reflux condenser, and gas inlet dip tube, was charged with 500 cubic centimeters of water, 42.3 grams of 97 percent NaOH, 57 grams of Bisphenol-A, and 0.423 gram of phenol (added as 8.5 cubic centimeters of a 5 percent aqueous solution), producing a warm aqueous solution of sodium bisphenate. The solution was cooled to room temperature. Methylene chloride, 500 cubic centimeters, was added and the reaction mixture stirred. Phosgene, 35 grams, was bubbled in steadily with stirring over a period of 66 minutes at 22–25° C., using a cold water bath to remove heat of exotherm and maintain constant temperature. After all of the phosgene was in stirring was continued for an additional 30 minutes at room temperature.

At this point half of the reaction mixture was removed. The organic phase was washed to pH 7 with water and the polymer precipitated by adding 1 liter of acetone. The molecular weight was found to be 4,600.

The remainder of the reaction mixture was refluxed an additional 60 minutes. The organic phase was washed to pH 7 with water and the polymer precipitated by adding 1 liter of acetone. The molecular weight was found to be 5,400.

EXAMPLE 2

*Polycarbonate preparation using 0.32 gram of tetraphenyl phosphonium iodide*

A polycarbonate resin was prepared in a manner after Example 1, with the addition of 0.32 gram of tetraphenyl phosphonium iodide to the reaction mixture as catalyst before phosgenation and with a post-phosgenation stirring period of 90 minutes. The molecular weight of the resultant polymer was found to be 46,000.

EXAMPLE 3

*Polycarbonate preparation using 0.019 gram of tetrabutyl phosphonium iodide*

A polycarbonate resin was prepared in a manner after Example 1, with the addition of 0.019 gram of tetrabutyl phosphonium iodide to the reaction mixture as catalyst before phosgenation. Half of the reaction mixture was subjected to post-phosgenation stirring at reflux for 1 hour and the molecular weight of the resultant polymer was found to be 28,000. The remainder of the reaction mixture was refluxed for two hours after phosgenation and the molecular weight found to be 66,200.

EXAMPLE 4

*Comparative example*

A polycarbonate resin was prepared in a manner after Example 1 with the addition of 0.063 gram of benzyl triethyl ammonium chloride to the reaction mixture as catalyst before phosgenation. Half of the reaction mixture was stirred at room temperature for one hour after phosgenation and the molecular weight of the resultant polymer was found to be 13,300. Sodium hydroxide, 3.52 grams, was added to the remainder of the reaction mixture and the mixture stirred at reflux for two hours after phosgenation. The molecular weight was found to be 20,200.

EXAMPLE 5

*Polycarbonate preparation without catalyst*

A 1-liter resin pot was fitted with a stirrer, thermometer, reflux condenser, and gas inlet dip tube. The reactor was thoroughly flushed with nitrogen and a nitrogen bleed was maintained until phosgenation was started. The reactor was charged with 500 cubic centimeters of water, 28.6 grams of 97 percent NaOH, and 57 grams of Bisphenol-A, producing a warm aqueous solution of sodium bisphenate. The solution was cooled to 30° C. Methylene chloride, 500 cubic centimeters, was added and the reaction mixture stirred. Phosgene, 27.1 grams, was bubbled in steadily with stirring over a period of 56 minutes at 30° C., using a cold water bath to remove heat of exotherm and maintain constant temperature.

At this point a small sample of the organic phase was removed and washed with diluted HCl and tap water to a pH of about 6 to 7. The polymer was recovered from solution by evaporating off the solvent in a 70° C. oven over a period of about 15 hours. The molecular weight was found to be 3,400.

Half of the remaining reaction mixture was stirred in a nitrogen flushed reactor for 30 minutes at room temperature, and the polymer recovered from solution as above. The molecular weight was found to be 11,700.

EXAMPLE 6

*Polycarbonate preparation using 0.032 grams of tetrabutyl phosphonium iodide*

Tetrabutyl phosphonium iodide in an amount of 0.032 gram was added as a cttalyst to the remainder of the reaction mixture from Example 5. The reaction mixture was stirred in a nitrogen flushed reactor for 30 minutes at room temperature and the polymer recovered from solution as in Example 5. The molecular weight was found to be 100,000.

EXAMPLE 7

*Polycarbonate preparation using 0.064 gram of tetrabutyl phosphonium iodide*

A polycarbonate resin was prepared in a manner after Example 5, with the addition of 0.064 gram of tetrabutyl phosphonium iodide to the reaction mixture as catalyst before phosgenation. A post-phosgenation stirring period of nine minutes at room temperature resulted in a polymer of molecular weight of 119,000, and a post-phosgenation stirring period of 29 minutes at room temperature resulted in a polymer of molecular weight of 199,500.

EXAMPLE 8

*Polycarbonate preparation using 0.064 gram of tetrabutyl phosphonium bromide*

A polycarbonate resin was prepared in a manner after Example 5, with the addition of 0.064 gram of tetrabutyl phosphonium bromide to the reaction mixture as catalyst before phosgenation. A post-phosgenation stirring period of 40 minutes at room temperature resulted in a polymer of molecular weight of 132,000.

This present invention may be embodied in other forms or carried out in other ways without departing from the spirit or essential characteristics thereof. The present embodiment is therefore to be considered as in all respects illustrative and not restrictive, the scope of the invention being indicated by the appended claims and all change which come within the meaning and range of equivalency are intended to be embraced therein.

I claim:

1. A process for the preparation of a polycarbonate resin which comprises reacting together phosgene and a di-monohydroxyaryl-alkane in an aqueous alkaline medium in the presence of an inert organic solvent which is immiscible in the aqueous phase, and in the presence of a catalytic amount of a quaternary phosphonium compound soluble in the reaction medium as a catalyst for the reaction.

2. A process according to claim 1 wherein said quaternary phosphonium compound is employed in an amount from 0.001 to 5.0 percent by weight of the di-monohydroxyaryl-alkane.

3. The process according to claim 2 wherein at least 0.1 mole of phosgene is reacted with 1 mole of di-monohydroxyaryl-alkane.

4. A process according to claim 3 wherein said di-monohydroxyaryl-alkane is 2,2-(4,4'-dihydroxy-diphenyl)-propane.

5. A process according to claim 4 wherein said quaternary phosphonium compound is a tetra-aryl phosphonium halide.

6. A process according to claim 4 wherein said quaternary phosphonium compound is a tetra-alkyl phosphonium halide.

7. A process according to claim 5 wherein said tetra-aryl phosphonium halide is tetraphenyl phosphonium iodide.

8. A process according to claim 6 wherein said tetra-alkyl phosphonium halide is tetrabutyl phosphonium iodide.

9. A process according to claim 6 wherein said tetra-alkyl phosphonium halide is tetrabutyl phosphonium bromide.

No references cited.